United States Patent
Lu et al.

(10) Patent No.: US 12,492,939 B1
(45) Date of Patent: Dec. 9, 2025

(54) META-SURFACE-BASED SPECTRAL CONFOCAL DISPLACEMENT MEASUREMENT METHOD, DEVICE THEREOF AND STORAGE MEDIUM

(71) Applicant: Huazhong University of Science and Technology, Wuhan (CN)

(72) Inventors: Wenlong Lu, Wuhan (CN); Yunquan Wu, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 19/278,440

(22) Filed: Jul. 23, 2025

(30) Foreign Application Priority Data

Aug. 5, 2024 (CN) .......................... 202411060476.4

(51) Int. Cl.
*G01J 3/02* (2006.01)
*G02B 1/00* (2006.01)

(52) U.S. Cl.
CPC ........... *G01J 3/0216* (2013.01); *G01J 3/0208* (2013.01); *G02B 1/002* (2013.01)

(58) Field of Classification Search
CPC ....................... G01B 9/02042; G01B 9/02043; G01B 11/02; G01B 11/00; G01B 2210/50; G01B 11/24; G01B 11/06; G01B 11/03; G01B 11/30; G01J 3/0216; G01J 3/0208
USPC ....................................................... 356/326
See application file for complete search history.

(56) References Cited

U.S. PATENT DOCUMENTS

2021/0044748 A1* 2/2021 Hu .......................... G02B 13/06

FOREIGN PATENT DOCUMENTS

CN 115014208 A * 9/2022 ............. G01B 11/02

OTHER PUBLICATIONS

First Office Action for CN 202411060476.4, dated Oct. 8, 2024. China National Intellectual Property Administration, Beijing, China.

* cited by examiner

*Primary Examiner* — Sunghee Y Gray
(74) *Attorney, Agent, or Firm* — M&B IP Analysts, LLC

(57) ABSTRACT

Provided are a meta-surface-based spectral confocal displacement measurement method. The method includes: using micro-nano structures on a meta-surface to allow different wavelengths of broadband parallel light passing through a collimating lens to have different focal lengths to obtain a focal length sequence; determining an arrangement manner of the micro-nano structures according to working phases and a working focal length of the micro-nano structures and a working wavelength of the broadband parallel light; determining the working phases of the micro-nano structures according to a size of each micro-nano structure, the working wavelength of the broadband parallel light, a refractive index of the air, and a refractive index of material of the micro-nano structures; and obtaining spectral signals by a spectrometer to output wavelength sequence data and light intensity sequence data to obtain a measurement result when a measured object is located in the focal length sequence.

8 Claims, 5 Drawing Sheets

GAWO P3405

Arranging a meta-surface opposite to a collimating lens, and using micro-nano structures on the meta-surface to allow different wavelengths of broadband parallel light passing through the collimating lens to have different focal lengths to obtain a focal length sequence; wherein an arrangement manner of the micro-nano structures is determined according to working phases and a working focal length of the micro-nano structures and a working wavelength of the broadband parallel light; and the working phases of the micro-nano structures are determined according to a size of each micro-nano structure, the working wavelength of the broadband parallel light, a refractive index of air, and a refractive index of material of the micro-nano structures

Obtaining spectral signals by a spectrometer to output wavelength sequence data and light intensity sequence data when a measured object is located in the focal length sequence

Obtaining a measurement result based on the wavelength sequence data and the light intensity sequence data

FIG. 1

META-SURFACE-BASED SPECTRAL CONFOCAL DISPLACEMENT MEASUREMENT METHOD, DEVICE THEREOF AND STORAGE MEDIUM

CROSS-REFERENCE TO RELATED PRESENT DISCLOSURE

This patent application claims the benefit and priority of Chinese Patent Application No. 202411060476.4 filed with the China National Intellectual Property Administration on Aug. 5, 2024, the disclosure of which is incorporated by reference herein in its entirety as part of the application.

TECHNICAL FIELD

The present disclosure relates to the technical field of a high-precision displacement measurement method, and in particular, to a meta-surface-based spectral confocal displacement measurement method, a device thereof and a storage medium.

BACKGROUND

With the continuous development of science and technology, non-contact high-precision displacement measurement has gradually become the main precision measurement mean of advanced manufacturing. The existing non-contact measurement methods include a laser confocal measurement method, a line laser measurement method, a structured light measurement method, etc. However, all of the measurement methods have one or several defects, such as low measurement efficiency, low precision, difficulty in measuring a high reflective surface, and inability to measure high-curvature transition characteristics, which makes it difficult to meet the needs of high-efficiency and high-precision detection of parts.

At present, the spectral confocal sensing technology is widely used in measurement of parts in the fields of electronic manufacturing, aerospace, laser nuclear fusion, automobile, biology, and IC manufacturing because of its obvious advantages such as a small spot diameter, a large probe tolerance limit angle, a small probe volume and an axial chromatographic ability.

However, due to the limitation of the lens material and the structure, a traditional lens-type spectral confocal displacement sensor has some defects, such as a large probe volume and a heavy mass, so that the sensor cannot be applied to the micro-size measurement field with high precision and strict requirements, such as micropores and gaps.

Therefore, it is urgent to develop a non-contact and high-precision spectral confocal displacement measurement technology that can measure micro-sizes.

SUMMARY

The present disclosure provides a meta-surface-based spectral confocal displacement measurement method, a device thereof and a storage medium, which are used to solve the problem that a traditional lens-type spectral confocal displacement sensor cannot be applied to the micro-size measurement field with high precision and strict requirements, such as micropores and gaps.

In a first aspect, the present disclosure provides a meta-surface-based spectral confocal displacement measurement method, including:

arranging a meta-surface opposite to a collimating lens, and using micro-nano structures on a meta-surface to allow different wavelengths of broadband parallel light passing through a collimating lens to have different focal lengths to obtain a focal length sequence; and obtaining spectral signals by a spectrometer, to output wavelength sequence data and light intensity sequence data when a measured object is located in the focal length sequence, and obtaining a measurement result based on the wavelength sequence data and the light intensity sequence data;

wherein an arrangement manner of the micro-nano structures is determined according to a working phase and a working focal length of the micro-nano structures and a working wavelength of the broadband parallel light; and the working phase of the micro-nano structures is determined according to a size of the micro-nano structures, the working wavelength of the broadband parallel light, a refractive index of air, and a refractive index of material of the micro-nano structures.

Further, a method for determining the arrangement manner includes:

$$\varphi = \frac{2\pi}{\lambda}\left(f - \sqrt{f^2 + r^2}\right);$$

where $\varphi$ denotes a working phase; $\lambda$ denotes a working wavelength; f denotes a working focal length; polar coordinates with a center of the meta-surface as an origin are established, and r denotes a radius of the meta-surface or a coordinate in a y direction.

Further, a method for determining the working phase includes:

$$\varphi = \frac{2\pi}{\lambda} n_{eff} H;$$

where $\varphi$ denotes a working phase of the micro-nano structures; $\lambda$ denotes a working wavelength of the broadband parallel light; $n_{eff}$ denotes an effective refractive index of the meta-surface, $$n_{eff} = \sqrt{(n_{material}^2 - n_{air}^2)s + n_{air}^2},$$

$n_{material}$ denotes a refractive index of material of the micro-nano structures, and $n_{air}$ denotes a refractive index of air; s denotes a cross-sectional proportion of each micro-nano structure in a periodic space; and H denotes a height of the micro-nano structure.

Further, a method of obtaining the focal length sequence includes:

acquiring a central wavelength and a corresponding central focal length value, and obtaining a phase curve according to the arrangement manner of the micro-nano structures;

solving a focal length calculation model based on the phase curve, the coordinate in the y direction and the number of periodic spaces of the micro-nano structures in the y direction to obtain other focal length values; and arranging the central focal length value and the other focal length values to obtain a focal length sequence.

Further, the focal length calculation model is:

$$err(f_i) = \sum_{a=1}^{m} \left[\varphi(\lambda_{mid}, f_{mid}, r_a) + \frac{2\pi}{\lambda_i}\left(\sqrt{f_i^2 + r_a^2} - f_i\right)\right]^2;$$

where $\lambda_i \in \Lambda$, $\Lambda = [\lambda_1, \lambda_2, \ldots, \lambda_{mid}, \ldots, \lambda_{n-1}, \lambda_n]$, $\Lambda$ denotes wavelength sequence data, and $\lambda_{mid}$ denotes a central wavelength; $f_i \in F$, $F = [f_1, f_2, \ldots, f_{mid}, \ldots, f_{n-1}, f_n]$, F denotes a focal length sequence, and $f_{mid}$ denotes a central focal length value; $\varphi(\lambda_{mid}, f_{mid}, r_a)$ denotes a phase curve obtained from the central wavelength and the central focal length value, $$\varphi(\lambda_{mid}, f_{mid}, r_a) = \frac{2\pi}{\lambda_{mid}}\left(f_{mid} - \sqrt{f_{mid}^2 + r_a^2}\right),$$

$r_a$ denotes a coordinate in the y direction, and m denotes the number of periodic spaces of the micro-nano structures in the y direction.

Further, the solving includes:
taking a partial derivative for the focal length calculation model:

$$J(f_i^k) = 2\left[\varphi(\lambda_{mid}, f_{mid}, r_a) + \frac{2\pi}{\lambda_i}\left(\sqrt{(f_i^k)^2 + r^2} - f_i^k\right)\right] \cdot \frac{2\pi}{\lambda_i}\left[\frac{f_i^k}{\sqrt{(f_i^k)^2 + r^2}} - 1\right];$$

where $$f_i^k$$

denotes a focal length value of a k-th iteration; and an iterative formula is:

$$f_i^{k+1} = f_i^k - \frac{err(f_i^k)}{J(f_i^k)}.$$

Further, obtaining a measurement result based on the wavelength sequence data and the light intensity sequence data includes:
calculating a peak wavelength $\lambda_0$ according to the wavelength sequence data and the light intensity sequence data; and
calculating the measurement result $Z_0$ according to the peak wavelengths.

Further, a cross section of each micro-nano structure is in a central symmetric shape.

In a second aspect, the present disclosure provides a meta-surface-based spectral confocal displacement measurement device, wherein the device includes a light source assembly, a collimating lens, a meta-surface, a spectrometer and an analysis module, and is configured to implement steps of the method described above.

In a third aspect, the present disclosure provides a computer-readable storage medium on which computer program/instructions are stored, wherein the computer program/instructions, when executed by a processor, implement steps of the method described above.

Generally speaking, the present disclosure provides a meta-surface-based spectral confocal displacement measurement method, a device thereof and a storage medium. Compared with the prior art, the technical solution conceived by the present disclosure can achieve the following beneficial effects.

(1) By using the meta-surface to control the light field dispersion, it is not necessary to optimize the aberration of the lens, but only to design the phases. Compared with the traditional lens, the device according to the present disclosure is not only small in size and light in mass, but also can be used in microporous structures such as micropores and gaps, as well as measurement projects with high precision and strict requirements on the volume and the mass of a measuring device.

(2) The micro-nano structure design method according to the present disclosure can widen the phase design of the meta-surface to 3000 rad, and further widen the diameter of the meta-surface to a centimeter level. The problem that the diameter of the meta-surface designed by the traditional method is limited and the phase control is limited by the micro-nano structures is solved, thereby realizing a large range of light field dispersion control, more flexible range design, simple lens group, and large measuring range ranging from 1 micron to 10000 microns.

BRIEF DESCRIPTION OF THE DRAWINGS

In order to explain the technical solution of the present disclosure or the prior art more clearly, the drawings needed in the description of the embodiments or the prior art will be briefly introduced below. Obviously, the drawings in the following description are some embodiments of the present disclosure. Other drawings can be obtained according to these drawings without paying creative labor for those skilled in the art.

FIG. 1 is a method schematic diagram of a meta-surface-based spectral confocal displacement measurement method, a device thereof and a storage medium according to the present disclosure;

DETAILED DESCRIPTION OF THE EMBODIMENTS

Figure 2:
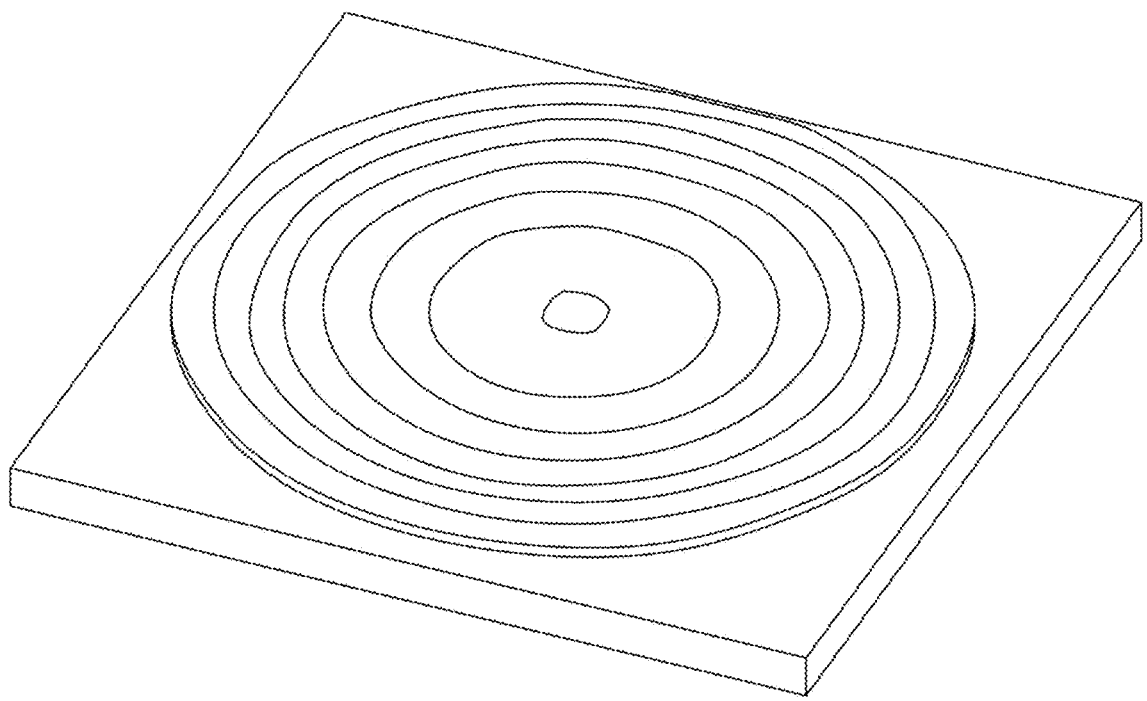
FIG. 2 is a schematic diagram of $Si_3N_4$ micro-nano structures of a meta-surface-based spectral confocal displacement measurement method, a device thereof and a storage medium according to the present disclosure.

In order to make the objective, the technical solution and the advantages of the present disclosure more clearly, the technical solution of the present disclosure will be described clearly and completely with reference to the attached drawings and embodiments. Obviously, the described embodiments are some embodiments of the present disclosure, rather than all of the embodiments. Based on the embodiments in the present disclosure, all other embodiments obtained by those skilled in the art without paying creative labor belong to the scope of protection of the present disclosure.

It should be noted that in the description of embodiments of the present disclosure, the terms "including", "comprising" or any other variations thereof are intended to cover non-exclusive inclusion, so that a method, a step or a device including a series of elements includes not only those elements, but also other elements not explicitly listed, or elements inherent to such a method, step or device. Without more limitations, the element defined by the sentence "including a" does not exclude that there are other identical elements in the method, step or device including the element.

The size of the meta-surface designed by the traditional method is limited, and the phase control is limited by the micro-nano structures, so that the phases are designed to be not more than 100 rad and the diameter of the meta-surface is designed to be not more than 200 μm. By designing the phases and the arrangement manner of the micro-nano structures, the present disclosure can widen the phase design of the meta-surface to 3000 rad, and further widen the diameter of the meta-surface to be close to a centimeter level, thereby realizing the control of light field dispersion in a large range. The range design is more flexible, the lens group is simple, and the measuring range can be up to 10 mm at most.

A meta-surface-based spectral confocal displacement measurement method is provided, as shown in FIG. 1, and the method includes: arranging a meta-surface opposite to a collimating lens, and using micro-nano structures on the meta-surface to allow different wavelengths of broadband parallel light passing through the collimating lens to have different focal lengths to obtain a focal length sequence; and obtaining spectral signals by a spectrometer to output wavelength sequence data and light intensity sequence data when a measured object is located in the focal length sequence, and obtaining a measurement result based on the wavelength sequence data and the light intensity sequence data.

It should be noted that the broadband parallel light refers to the light in the band of 450 nm to 750 nm.

The meta-surface includes a glass substrate and micro-nano structures. The micro-nano structures can be obtained by a process such as vapor chemical deposition, lithography and etching.

An arrangement manner of the micro-nano structures is determined according to working phases and a working focal length of the micro-nano structures and a working wavelength of the broadband parallel light. That is, the micro-nano structures are used to generate phases, so that different wavelengths have different focal lengths.

As a preferred embodiment of the present disclosure, the arrangement manner of the micro-nano structures satisfies:

$$\varphi = \frac{2\pi}{\lambda}\left(f - \sqrt{f^2 + r^2}\right),$$

that is, how the phases are distributed on the meta-surface is determined, where $\varphi$ denotes a working phase; $\lambda$ denotes a working wavelength; f denotes a working focal length; polar coordinates with a center of the meta-surface as an origin are established, and r denotes a radius of the meta-surface or a coordinate in a y direction.

It should be noted that the arrangement manner of the micro-nano structures can be a circle, a square, a rectangle or a triangle that spreads outwards from the center of the meta-surface.

Figure 3:
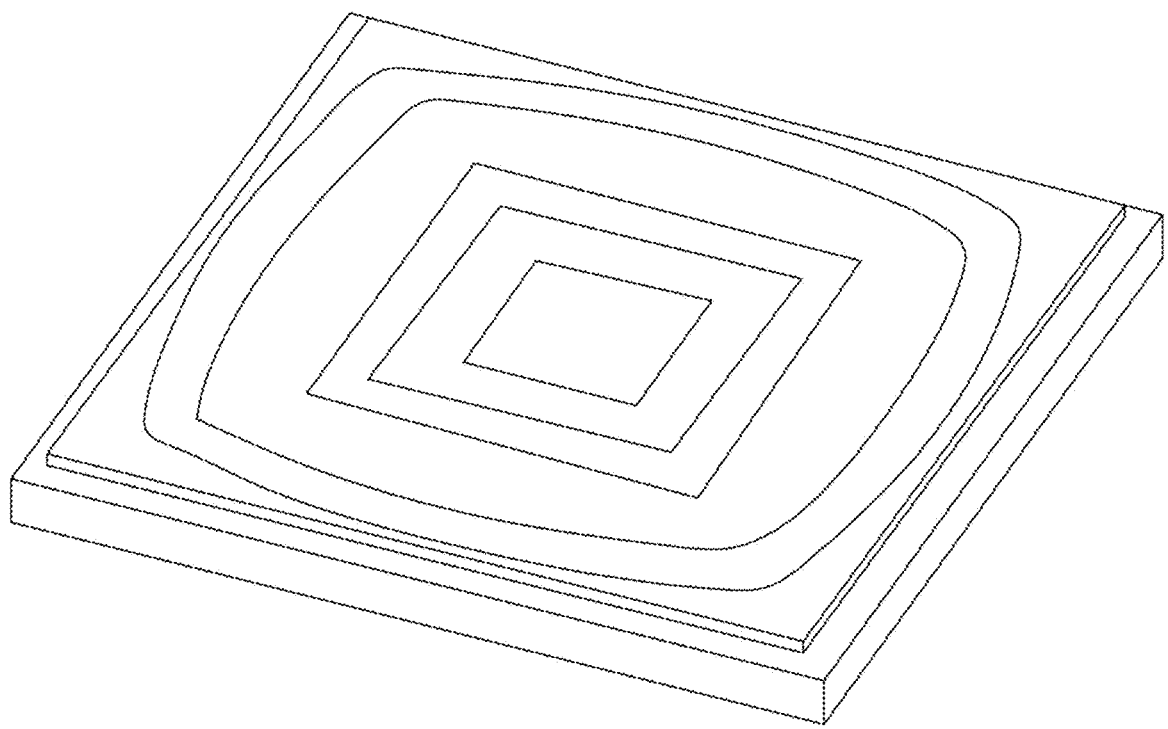
FIG. 3 is a first schematic diagram of an arrangement manner of $Si_3N_4$ micro-nano structures of a meta-surface-based spectral confocal displacement measurement method, a device thereof and a storage medium according to the present disclosure.

For example, when the arrangement manner of the micro-nano structures is circular, as shown in FIG. 2, r denotes a radius of the meta-surface. When the arrangement manner of the micro-nano structures is square, as shown in FIG. 3, r denotes a coordinate in the y direction, and the phases in the x direction are equal.

Furthermore, a working phase of a micro-nano structure is determined according to a size of the micro-nano structure, the working wavelength of the broadband parallel light, a refractive index of the air, and a refractive index of the material of the micro-nano structure. Different wavelengths of broadband parallel light passing through a collimating lens have different focal lengths, that is, different wavelengths are focused on different focal planes.

The size of the micro-nano structure includes the height of the micro-nano structure and the cross-sectional proportion of the micro-nano structure in a periodic space.

As an embodiment of the present disclosure, the working phase of the micro-nano structure satisfies:

$$\varphi = \frac{2\pi}{\lambda}n_{eff}H,$$

that is, how to calculate the phase through the micro-nano structure; where $\varphi$ denotes a working phase of the micro-nano structure; $\lambda$ denotes a working wavelength of the broadband parallel light; $n_{eff}$ denotes an effective refractive index of the meta-surface, $$n_{eff} = \sqrt{(n_{material}^2 - n_{air}^2)s + n_{air}^2},$$

$n_{material}$ denotes a refractive index of the material of the micro-nano structure, and $n_{air}$ denotes a refractive index of the air; s denotes a cross-sectional proportion of the micro-nano structure in a periodic space; and H denotes a height of the micro-nano structure.

It should be noted that the cross-sectional proportion of the micro-nano structure in the periodic space is the ratio of the cross-sectional area $S_{material}$ of micro-nano material in the periodic space to the cross-sectional area $S_{periodic}$ space of the periodic space, that is, $s = S_{material}/S_{periodic}$ space. However, a cross section of the micro-nano structure is preferably in a central symmetric shape, for example, a round, a square, a regular triangle, a ring, etc.

The heights of the micro-nano structures can be determined according to the material of the micro-nano structures. For example, the material of the micro-nano structures is $Si_3N_4$, and the heights of the micro-nano structures can be 700 nm, 800 nm or 900 nm. Any material and any size of the micro-nano structures satisfying the design manner of the working phases of the micro-nano structures can focus the broadband parallel light on different focal planes.

Figure 4:
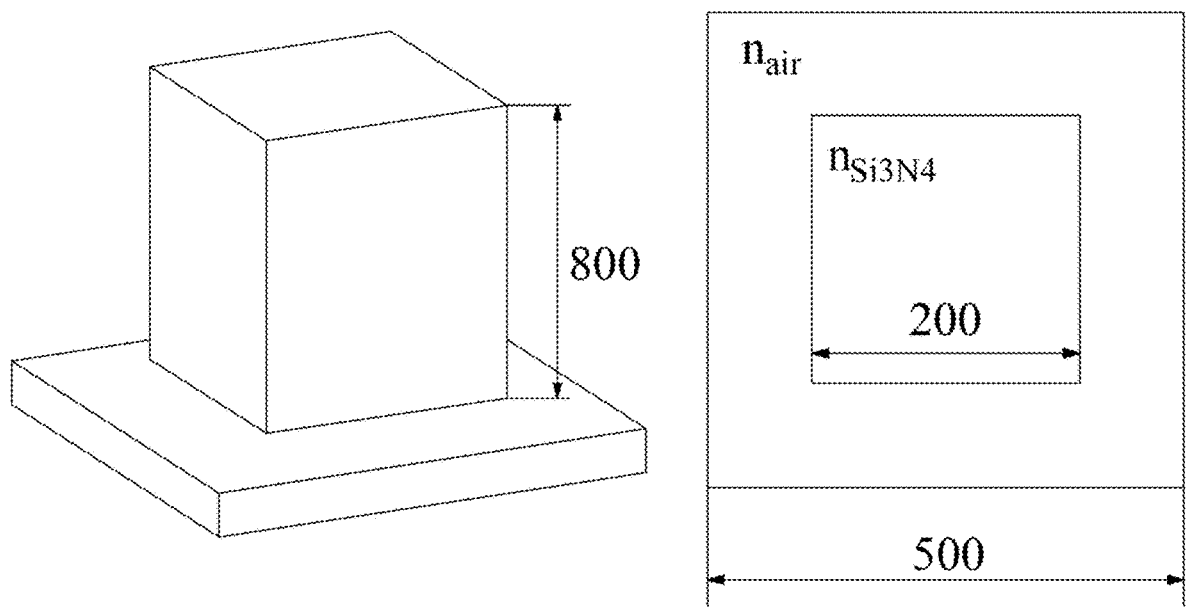
FIG. 4 is a second schematic diagram of an arrangement manner of $Si_3N_4$ micro-nano structures of a meta-surface-based spectral confocal displacement measurement method, a device thereof and a storage medium according to the present disclosure.

As a specific example, as shown in FIG. 4, the micro-nano structure is a square micro-nano column and is located in the center of the space, in which the material of the micro-nano structure is $Si_3N_4$, and if the structure of each periodic space is: 500 nm long, 500 nm wide and 800 nm high; the space includes air and $Si_3N_4$; and the size of $Si_3N_4$ micro-nano structure is: 200 nm long, 200 nm wide and 800 nm high, the cross-sectional area of the periodic space is $S_{periodic\ space}$=500×500 $nm^2$, and the cross-sectional area of micro-nano material $Si_3N_4$ is $$S_{material} = 200 \times 200 \text{ nm}^2,$$

$$\text{and then } s = S_{material}/S_{periodic\ space} = \frac{200 \times 200}{500 \times 500} = 0.16.$$

The micro-nano structures on a meta-surface are used to allow different wavelengths of broadband parallel light passing through a collimating lens to have different focal lengths to obtain a focal length sequence.

It should be noted that a method of acquiring the focal length sequence includes:

acquiring a central wavelength and a corresponding central focal length value, and obtaining a phase curve according to the arrangement manner of the micro-nano structures; establishing, solving and iterating a focal length calculation model based on the phase curve, the coordinates in the y direction and the number of periodic spaces of the micro-nano structures in the y direction to obtain other focal length values; and arranging the central focal length value and the other focal length values to obtain the focal length sequence.

The method of acquiring the central wavelength includes: arranging the wavelengths of a plurality of acquired spectrums in sequence according to the wavelength size to obtain the wavelength sequence $\Lambda=[\lambda_1, \lambda_2, \ldots \lambda_{mid}, \ldots, \lambda_{n-1}, \lambda_n]$; and the central wavelength $\lambda_{mid}$ is an $n/2^{th}$ or an $(n+1)/2^{th}$ wavelength arranged in the wavelength sequence.

Because the wavelengths correspond to the focal lengths one by one, the central focal length value $f_{mid}$ can be obtained directly based on the central wavelength $\lambda_{mid}$.

Obtaining a phase curve according to the arrangement manner of the micro-nano structures includes: inputting the central wavelength $\lambda_{mid}$ and the central focal length value $f_{mid}$ into the arrangement formula of the micro-nano structures, that is, $$\varphi(\lambda_{mid}, f_{mid}, r_a) = \frac{2\pi}{\lambda_{mid}}\left(f_{mid} - \sqrt{f_{mid}^2 + r_a^2}\right).$$

As an embodiment of the present disclosure, the focal length calculation model includes:

$$err(f_i) = \sum_{a=1}^{m}\left[\varphi(\lambda_{mid}, f_{mid}, r_a) + \frac{2\pi}{\lambda_i}\left(\sqrt{f_i^2 + r_a^2} - f_i\right)\right]^2;$$

where $\lambda_i \in \Lambda$, $\Lambda=[\lambda_1, \lambda_2, \ldots, \lambda_{mid}, \ldots, \lambda_{n-1}, \lambda_n]$ denotes the wavelength sequence data, and $\lambda_{mid}$ denotes a central wavelength; $f_i \in F$, $F=[f_1, f_2, \ldots, f_{mid}, f_{n-1}, f_n]$, F denotes a focal length sequence, and $f_{mid}$ denotes a central focal length value; $\varphi(\lambda_{mid}, f_{mid}, r_a)$ denotes a phase curve obtained from the central wavelength and the central focal length value, $$\varphi(\lambda_{mid}, f_{mid}, r_a) = \frac{2\pi}{\lambda_{mid}}\left(f_{mid} - \sqrt{f_{mid}^2 + r_a^2}\right),$$

$r_a$ denotes a coordinate in the y direction, λmid and m denotes the number of periodic spaces of the micro-nano structures in the y direction.

Solving a focal length calculation model to obtain other focal length values includes:

taking a partial derivative for the focal length calculation model:

$$J(f_i^k) = 2\left[\varphi(\lambda_{mid}, f_{mid}, r_a) + \frac{2\pi}{\lambda_i}\left(\sqrt{(f_i^k)^2 + r^2} - f_i^k\right)\right] \cdot$$

$$\frac{2\pi}{\lambda_i}\left[\frac{f_i^k}{\sqrt{(f_i^k)^2 + r^2}} - 1\right]; \text{where } f_i^k$$

denotes a focal length value of a k-th iteration; and an iterative formula is:

$$f_i^{k+1} = f_i^k - \frac{err(f_i^k)}{J(f_i^k)}.$$

It should be noted that other focal length values are focal length values corresponding to other wavelengths except the central wavelength in the wavelength sequence data.

For example, in the wavelength sequence data $\Lambda=[\lambda_1, \lambda_2, \lambda_3, \lambda_4, \lambda_5]$, $\lambda_3$ is the central wavelength, the central focal length value $f_3$ can be obtained correspondingly according to $\lambda_3$ as the central wavelength, and other focal length values $f_1, f_2, f_3, f_3, f_5$ in the focal length sequence $F=[f_1, f_2, f_3, f_4, f_5]$ are obtained by the focal length calculation model.

The central focal length value and other focal length values are arranged to obtain a focal length sequence. Preferably, the arrangement manner of the focal length sequence corresponds to the arrangement of the wavelength sequence data.

It should be noted that the central focal length value is obtained correspondingly by inputting the central wavelength into a wavelength-focal length curve to obtain the central focal length.

Figure 5:
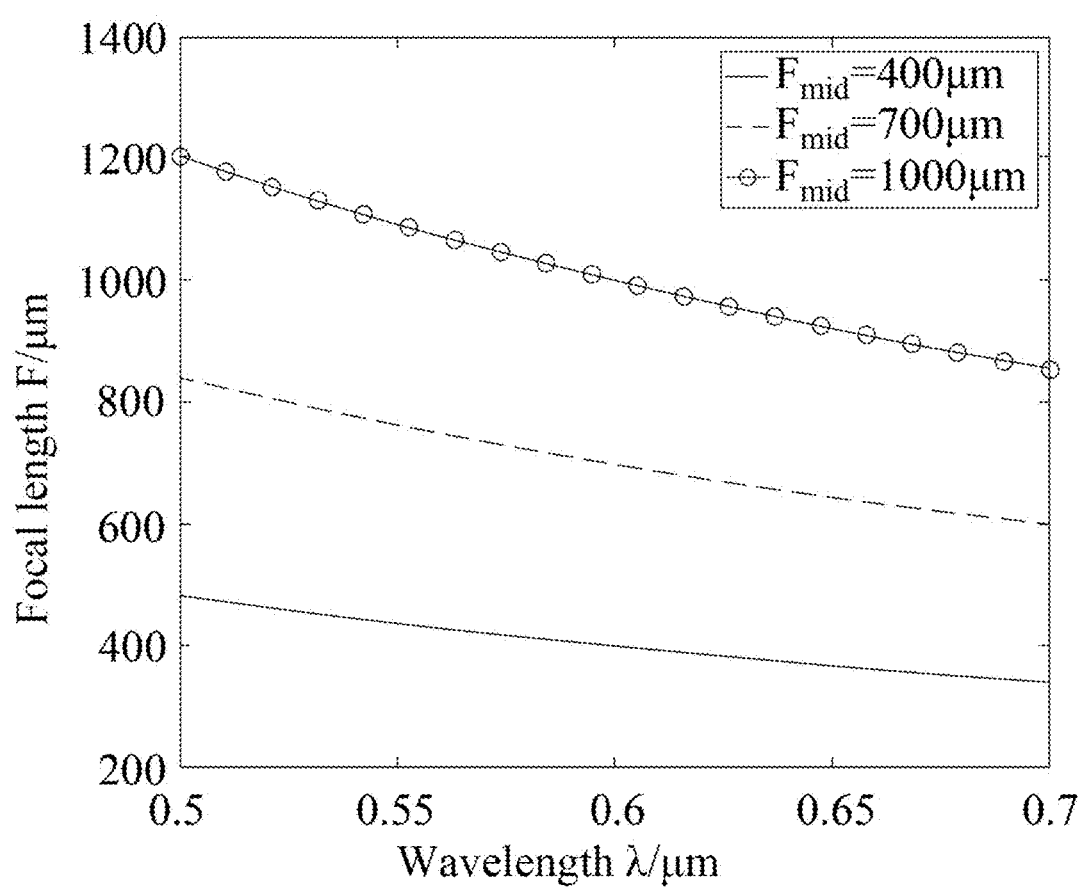
FIG. 5 is wavelength-focal length curves of a meta-surface-based spectral confocal displacement measurement method, a device thereof and a storage medium according to the present disclosure when the central wavelength is 0.6 m and the central focal length values are 400 m, 700 m and 1000 m.

As an embodiment of the present disclosure, as shown in FIG. 5, wavelength-focal length curves when the central wavelength is 0.6 μm and the central focal length values are 400 μm, 700 μm and 1000 μm are shown.

When the measured object is located in the focal length sequence, the spectral signals are obtained by the spectrometer, and the wavelength sequence data and the light intensity sequence data are output.

Figure 6:
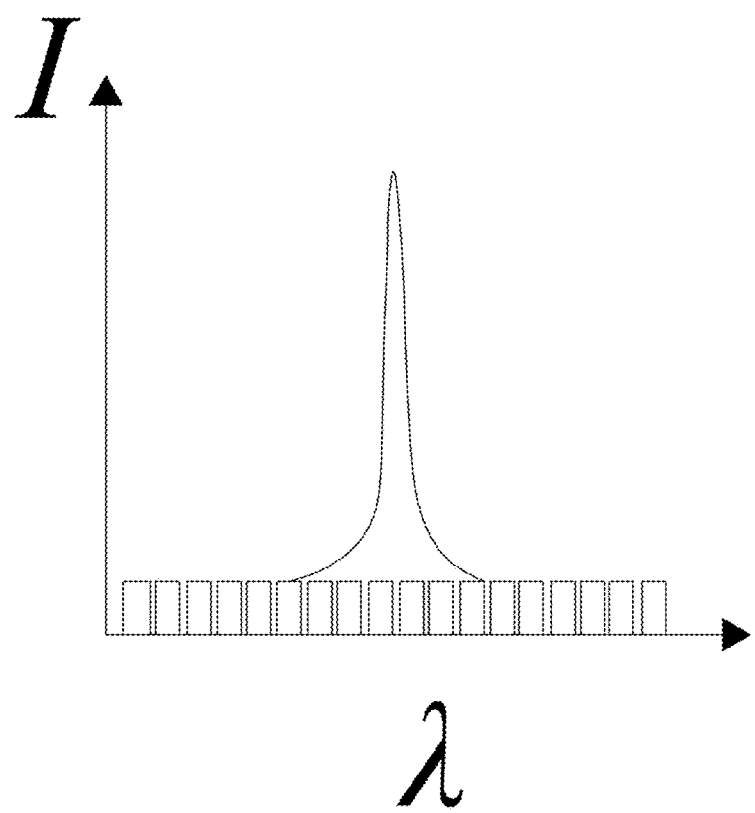
FIG. 6 is a schematic diagram of a wavelength-spectral light intensity curve of a meta-surface-based spectral confocal displacement measurement method, a device thereof and a storage medium according to the present disclosure.

The light intensity sequence data can be obtained based on the wavelength sequence data. As an embodiment, as shown in FIG. 6, the light intensity sequence data is $I=[I(\lambda_1), I(\lambda_2), \ldots, I(\lambda_{n-1}), I(\lambda_n)]$, one wavelength corresponds to one light intensity, and the wavelength sequence data corresponds to the light intensity sequence data.

Obtaining a measurement result based on the wavelength sequence data and the light intensity sequence data includes: calculating a peak wavelength $\lambda_0$ according to the wavelength sequence data and the light intensity sequence data; and calculating the measurement result $Z_0$ according to the peak wavelength.

As an embodiment, a method for calculating the peak wavelength $\lambda_0$ includes:

$$\lambda_0 = \frac{\sum \lambda \cdot I(\lambda)}{\sum \lambda}, \lambda \in [\lambda_1, \lambda_2, \ldots \lambda_{mid}, \ldots, \lambda_{n-1}, \lambda_n];$$

where $\Lambda = [\lambda_1, \lambda_2, \ldots \lambda_{mid}, \ldots, \lambda_{n-1}, \lambda_n]$, $\Lambda$ denotes wavelength sequence data; $\lambda_i$ denotes different wavelengths, $i \in [1,n]$; $I = [I(\lambda_1), I(\lambda_2), \ldots, I(\lambda_{n-1}), I(\lambda_n)]$ denotes light intensity sequence data.

As an embodiment, a method for calculating the measurement result $Z_0$ includes:

$$Z_0 = a_0 + \sum_{i=1}^{m} a_i \cdot \lambda_0^i;$$

where $a_0$ and $a_i$ denote polynomial coefficients.

Figure 7:
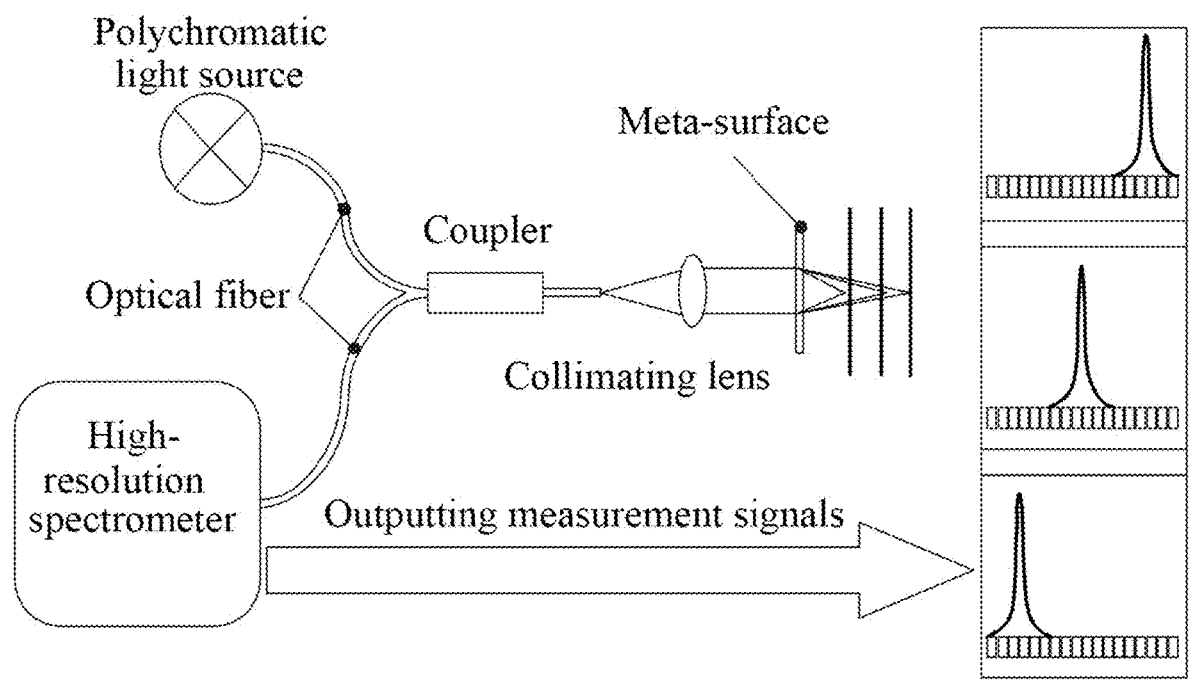
FIG. 7 is a device schematic diagram of a meta-surface-based spectral confocal displacement measurement method, a device thereof and a storage medium according to the present disclosure.

In a second aspect, the present disclosure further provides a meta-surface-based spectral confocal displacement measurement device. As shown in FIG. 7, the device includes a light source assembly, a collimating lens, a meta-surface, a spectrometer and an analysis module, and is configured to implement steps of the method described above.

In a third aspect, the present disclosure further provides a computer-readable storage medium on which a computer program/instruction is stored, wherein the computer program/instruction, when executed by a processor, implements steps of the method described above.

In conclusion, according to the present disclosure, by using the meta-surface to control the light field dispersion, it is not necessary to optimize the aberration of the lens, but only to design the phases. Compared with the traditional lens, the lens according to the present disclosure is not only small in size and light in mass, but also can be used in microporous structures such as micropores and gaps, as well as in measurement items with high precision and strict requirements on the volume and the mass of a measuring device. In addition, the micro-nano structure design method according to the present disclosure can widen the phase design of the meta-surface to 3000 rad, and further widen the diameter of the meta-surface to a centimeter level. The problem that the diameter of the meta-surface designed by the traditional method is limited and the phase control is limited by the micro-nano structures is solved, thereby realizing the control of light field dispersion in a large range. The range design is more flexible, the lens group is simple, and the measuring range is large, which is ranging from 1 micron to 10000 microns.

It should be noted that for the sake of simple description, all the foregoing embodiments are expressed as a series of action combinations, but those skilled in the art should know that the present disclosure is not limited by the described action order, because some steps can be performed in other orders or at the same time according to the present disclosure. Secondly, those skilled in the art should also know that the embodiments described in the specification are all preferred embodiments, and the actions and modules involved are not necessarily essential to the present disclosure.

In the foregoing embodiments, the description of each embodiment has its own focus. For the parts not detailed in one embodiment, refer to the relevant description of other embodiments.

In several embodiments provided by the present disclosure, it should be understood that the disclosed method or system can be implemented in other ways. For example, the embodiments described above are only schematic. For example, the division of the units is only a logical function division. In actual implementation, there may be another division method. For example, a plurality of units or components may be combined or integrated into another system, or some features may be ignored or not implemented.

The units described as separate components may or may not be physically separated, and the components displayed as units may or may not be physical units, that is, they may be located in one place or distributed to a plurality of network units. Some or all of the units can be selected according to actual needs to achieve the purpose of the solution of this embodiment.

In addition, each functional unit in each embodiment of the present disclosure can be integrated into one processing unit, or each unit can exist physically alone, or two or more units can be integrated into one unit. The above integrated units can be implemented in the form of hardware or software functional units.

The integrated unit can be stored in a computer-readable memory if it is implemented as a software functional unit and sold or used as an independent product. Based on this understanding, the technical solution of the present disclosure can be embodied in the form of software products in essence or in the part that contributes to the prior art or in all or part of the technical solution. The computer software products are stored in a memory and include several instructions, so that a computer device (which can be a personal computer, a server, a network device, etc.) implements all or part of the steps of the method described in various embodiments of the present disclosure.

Those skilled in the art can understand that all or part of each circuit in the foregoing embodiment can be completed by instructing relevant hardware through a program. The program can be stored in a computer-readable memory, which can include a USB flash drive, a Read-Only Memory (ROM), a Random Access Memory (RAM), a magnetic disk or an optical disk, etc.

What has been described above is only an example of the present disclosure, which cannot be used to limit the scope of the present disclosure. That is, all equivalent changes and modifications made in accordance with the teaching of the present disclosure are still within the scope of the present disclosure. Embodiments of the present disclosure will be readily conceivable to those skilled in the art after considering the specification and practicing the disclosure herein. The present disclosure is intended to cover any variations, uses or adaptive changes of the present disclosure, which follow the general principles of the present disclosure and include common sense or common technical means in the technical field not described in the present disclosure. The specification and the embodiments are regarded as exemplary only, and the scope and the spirit of the present disclosure are defined by the claims.

The technical features of the foregoing embodiments can be combined at will. In order to simplify the description, all possible combinations of the technical features in the foregoing embodiments are not described. As long as there is no contradiction between the combinations of these technical features, the combinations should be considered as the scope described in the present specification.

Those skilled in the art can easily understand that the above is only the preferred embodiment of the present disclosure, rather than limit the present disclosure. Any modification, equivalent substitution and improvement made within the spirit and the principle of the present disclosure should be included in the scope of protection of the present disclosure.

What is claimed is:

1. A meta-surface-based spectral confocal displacement measurement method, comprising:
    arranging a meta-surface opposite to a collimating lens, and using micro-nano structures on the meta-surface to allow different wavelengths of broadband parallel light passing through the collimating lens to have different focal lengths to obtain a focal length sequence;
    wherein a method for obtaining the focal length sequence comprises: acquiring a central wavelength and a corresponding central focal length value, and obtaining a phase curve according to the arrangement manner of the micro-nano structures; solving a focal length calculation model based on the phase curve, the coordinate in the y direction and a number of periodic spaces of the micro-nano structures in the y direction to obtain other focal length values; and arranging the central focal length value and the other focal length values to obtain the focal length sequence;
    wherein the focal length calculation model is:

$$err(f_i) = \sum_{a=1}^{m} \left[ \varphi(\lambda_{mid}, f_{mid}, r_a) + \frac{2\pi}{\lambda_i} \left( \sqrt{f_i^2 + r_a^2} - f_i \right) \right]^2;$$

where $\lambda_i \in \Lambda$, $\Lambda = [\lambda_1, \lambda_2, \ldots, \lambda_{mid}, \ldots, \lambda_{n-1}, \lambda_n]$, $\Lambda$ denotes wavelength sequence data, and $\lambda_{mid}$ denotes the central wavelength; $f_i \in F$, $F = [f_1, f_2, \ldots, f_{mid}, \ldots, f_{n-1}, f_n]$, F denotes the focal length sequence, and $f_{mid}$ denotes the central focal length value; $\varphi(\lambda_{mid}, f_{mid}, r_a)$ denotes the phase curve obtained from the central wavelength and the central focal length value, $$\varphi(\lambda_{mid}, f_{mid}, r_a) = \frac{2\pi}{\lambda_{mid}} \left( f_{mid} - \sqrt{f_{mid}^2 + r_a^2} \right),$$

$r_a$ denotes a coordinate in the y direction, $\lambda_{mid}$ and m denotes the number of the periodic spaces of the micro-nano structures in the y direction; and
    obtaining spectral signals by a spectrometer to output wavelength sequence data and light intensity sequence data when a measured object is located in the focal length sequence, calculating a peak wavelength $\lambda_0$ according to the wavelength sequence data and the light intensity sequence data, and calculating the measurement result $Z_0$ according to the peak wavelength;
    wherein an arrangement manner of the micro-nano structures is determined according to a working phase and a working focal length of the micro-nano structures and a working wavelength of the broadband parallel light; and the working phase of the micro-nano structures is determined according to a size of the micro-nano structures, the working wavelength of the broadband parallel light, a refractive index of air, and a refractive index of material of the micro-nano structures.

2. The meta-surface-based spectral confocal displacement measurement method according to claim 1, wherein a method for determining the arrangement manner comprises:

$$\varphi = \frac{2\pi}{\lambda} \left( f - \sqrt{f^2 + r^2} \right);$$

where $\varphi$ denotes a working phase; $\lambda$ denotes a working wavelength; f denotes a working focal length; polar coordinates with a center of the meta-surface as an origin are established, and r denotes a radius of the meta-surface or a coordinate in a y direction.

3. The meta-surface-based spectral confocal displacement measurement method according to claim 2, wherein a method for determining the working phase comprises:

$$\varphi = \frac{2\pi}{\lambda} n_{eff} H;$$

where $\varphi$ denotes a working phase of the micro-nano structures; $\lambda$ denotes the working wavelength of the broadband parallel light; $n_{eff}$ denotes an effective refractive index of the meta-surface, $$n_{eff} = \sqrt{(n_{material}^2 - n_{air}^2)s + n_{air}^2},$$

$n_{material}$ denotes a refractive index of material of the micro-nano structures, and $n_{air}$ denotes the refractive index of the air; s denotes a cross-sectional proportion of each micro-nano structure in a periodic space; and H denotes a height of the micro-nano structure.

4. The meta-surface-based spectral confocal displacement measurement method according to claim 1, wherein a method for determining the working phase comprises:

$$\varphi = \frac{2\pi}{\lambda} n_{eff} H;$$

where $\varphi$ denotes a working phase of the micro-nano structures; $\lambda$ denotes the working wavelength of the broadband parallel light; $n_{eff}$ denotes an effective refractive index of the meta-surface, $n_{eff} = \sqrt{(n_{material}^2 - n_{air}^2)s + n_{air}^2}$, $n_{material}$ denotes a refractive index of material of the micro-nano structures, and $n_{air}$ denotes the refractive index of the air; s denotes a cross-sectional proportion of each micro-nano structure in a periodic space; and H denotes a height of the micro-nano structure.

5. The meta-surface-based spectral confocal displacement measurement method according to claim 1, wherein the solving comprises:
    taking a partial derivative for the focal length calculation model:

$$J(f_i^k) = 2 \left[ \varphi(\lambda_{mid}, f_{mid}, r_a) + \frac{2\pi}{\lambda_i} \left( \sqrt{(f_i^k)^2 + r^2} - f_i^k \right) \right] \cdot \frac{2\pi}{\lambda_i} \left[ \frac{f_i^k}{\sqrt{(f_i^k)^2 + r^2}} - 1 \right];$$

where $$f_i^k$$

denotes a focal length value of a k-th iteration; and an iterative formula is:

$$f_i^{k+1} = f_i^k - \frac{err(f_i^k)}{J(f_i^k)}.$$

6. The meta-surface-based spectral confocal displacement measurement method according to claim 1, wherein a cross section of each micro-nano structure is in a central symmetric shape.

7. A meta-surface-based spectral confocal displacement measurement device, wherein the device comprises a light source assembly, a collimating lens, a meta-surface, a spectrometer and an analysis module, and is configured to implement steps of the method according to any one of claim 1.

8. A non-transitory computer-readable storage medium on which computer program/instructions are stored, wherein the computer program/instructions, when executed by a processor, implement steps of the method according to any one of claim 1.

* * * * *